July 16, 1968 R. V. MATHISON ETAL 3,392,426
PLASTIC ADJUSTABLE FASTENER
Filed Sept. 12, 1966 3 Sheets-Sheet 1
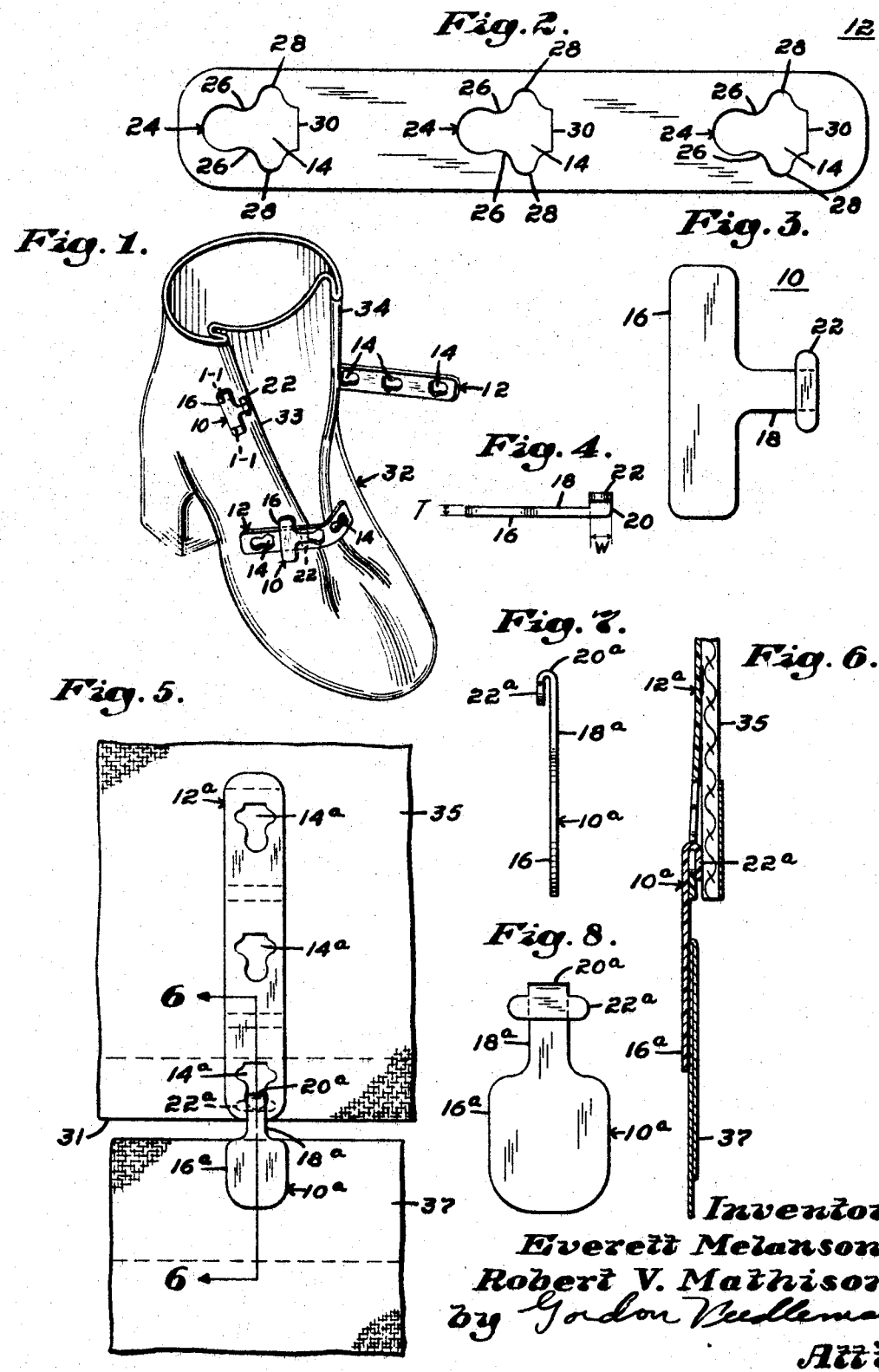

July 16, 1968   R. V. MATHISON ET AL   3,392,426
PLASTIC ADJUSTABLE FASTENER
Filed Sept. 12, 1966   3 Sheets-Sheet 2

Inventors:
Everett Melanson &
Robert V. Mathison,
by Gordon Needleman
Atty.

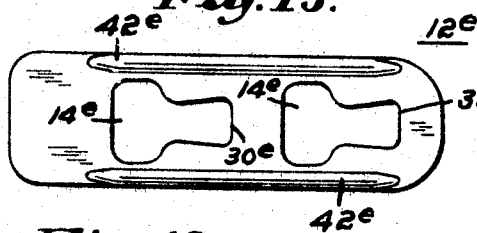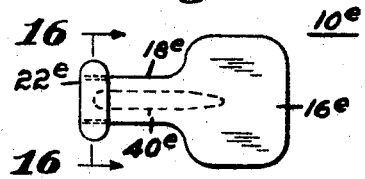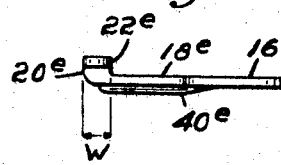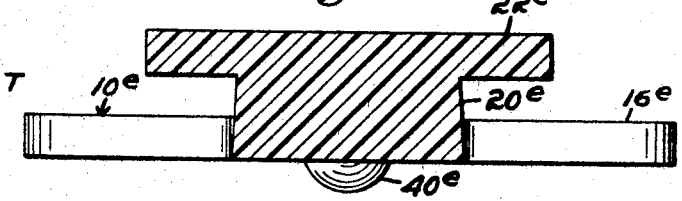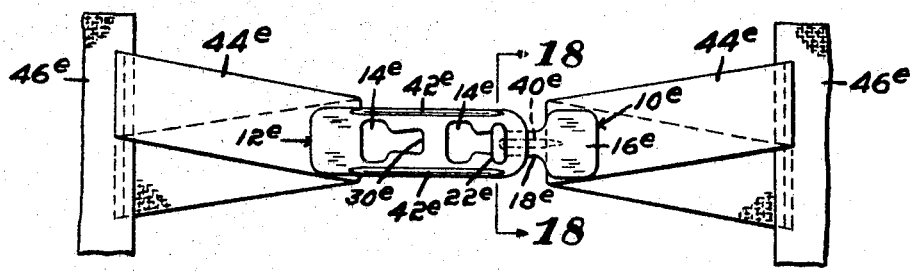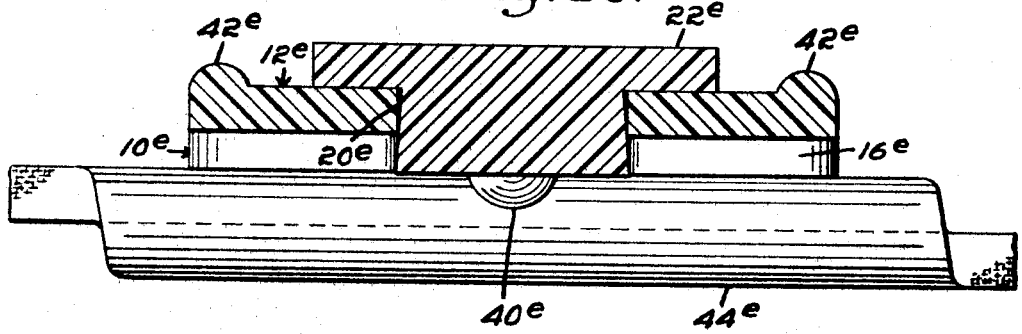

United States Patent Office 3,392,426
Patented July 16, 1968

3,392,426
PLASTIC ADJUSTABLE FASTENER
Robert V. Mathison, Asheville, N.C., and Everett Melanson, Wakefield, Mass., assignors to United-Carr Incorporated, Boston, Mass., a corporation of Delaware
Continuation-in-part of application Ser. No. 413,519, Nov. 24, 1964. This application Sept. 12, 1966, Ser. No. 584,380
5 Claims. (Cl. 24—222)

ABSTRACT OF THE DISCLOSURE

A low profile, synthetic plastic fastener combination. The female fastener member is characterized by a thin plastic strip having a male member receiving slot formed in its plane. The male fastener member is characterized by flat, planar base and extension portions, a solid connector portion of substantial width which seats against the rear wall of the slot in the female member, and a cross bar which lies flush against a substantial area of the female member adjacent the slot therein when the members are coupled.

---

This is a continuation-in-part of our previously co-pending application Ser. No. 413,519, filed Nov. 24, 1964, now abandoned.

This invention relates generally to fastening devices and more specifically to fastening devices utilizing male and female members.

An object of the present invetion is to provide a fastening device utilizing a T-shaped male member engageable with a keyhole slotted female member.

Another object of the present invention is to provide a T-shaped male member of a fastening device in which the cross piece or bar is spaced from the remaining portion of the member.

Another object of the present invention is to provide a female slotted member in which the wall of the slot provides a snap through engagement.

In the drawings:

FIG. 1 is a perspective of a boot having two of the male and female members attached, one pair of which is engaged together;

FIG. 2 is a top plan view of a female member of the fastening device;

FIG. 3 is a top plan view of a male member of the fastening device;

FIG. 4 is a side elevation of the male member shown in FIG. 3;

FIG. 5 is a top plan view showing the engagement of the male member with the female member attached to supports, the supports being broken off and the male member being a variation of that shown in FIG. 3;

FIG. 6 is a cross section taken through line 6—6 of FIG. 5;

FIG. 7 is a side elevation of the male member shown in FIG. 5;

FIG. 8 is a top plan of the male member shown in FIG. 7;

FIG. 13 is a top plan view of another variation of the female member shown in FIG. 2;

FIG. 14 is a top plan view of another variation of the male member shown in FIGS. 3 and 4;

FIG. 15 is a side elevation of the male member depicted in FIG. 14;

FIG. 16 is an enlarged view of a section taken on line 16—16 of FIG. 14;

FIG. 17 is a top plan view of an installation depicting the fasteners of FIGS. 13 and 14 as employed to secure the back straps of a brassiere; and FIG. 18 is an enlarged view of a section taken on line line 18—18 of FIG. 17.

Figure 9:
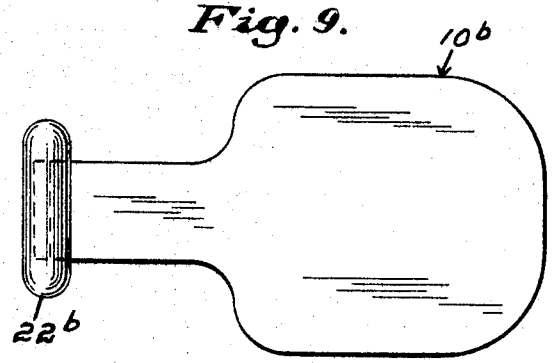
FIG. 9 is a top plan view of a variation of the male member shown in FIG. 3.

In the drawings there are shown in FIGS. 1 through 4 a male fastener element 10 and a female member 12. The female member 12 is disclosed as having a series of slots 14 formed therein; if desired, a single slot 14 could be utilized above.

The unitary male fastener element 10 is formed of a polymeric material comprising a base portion 16 which is generally rectangular in configuration and a substantially T-shaped engagement portion extending therefrom. The T-shaped engagement portion includes a rectangular extension portion 18, a solid connector portion 20 extending from and above the plane of the extension portion 18 and generally perpendicular thereto, and a bar 22 integral with the connector portion 20 extending transversely in relation to the plane of the extension portion in spaced relation thereto. The length of the bar 22 is greater than the width of the extension portion 18, providing an overhang on each side thereof. The connector portion 20 has a width $w$ measured in a plane parallel to the base portion and extension portion which is greater than the thickness $T$ of both the base portion and extension portion. The tips of the bar 22 which provide the overhangs may be arcuate in form if desired. The width of the bar 22 is generally equal to the width of the connector portion 20.

The female member 12 as shown in FIG. 2 comprises a base and series of spaced slots 14 formed therein, which are generally keyshaped in configuration. The wall of the slot 14 defines a semicircular socket portion 24 which is necked at its open end by a pair of arced, flexible locator portions 26 spaced from each other and each of which merges into a reversed curved portion 28. Each of the reversed curved portions terminates against a single back wall 30.

The female member 12 and the male member 10 may be used to fasten two movable parts together or to fasten a movable part to a fixed support. FIG. 1 discloses the use of the fastener asesmbly on a boot 32 to close the opening formed by two flaps 33 and 34. A series of male members 10 are engaged to the flaps 33 by tacking the base portion 16 transversely across the same, along two spaced lines 1—1 as shown in FIG. 1. This type of attachment because of the flexibility of the base 16 has a functional purpose which will be explained hereinafter.

This attachment places the bar 22 on a line with or inside the edge of the flap 33 and directed toward the outside surface thereof. The female member 12, in the embodiment disclosed, comprises a series of sockets 14 formed by punching or molding a rectangular strip of polymeric material which is generally rectangular in configuration but which may have its terminal ends rounded as shown in FIG. 2. The female member 12 is attached to the flap 34 of the boot 32 so that the series of sockets 14 all extend beyond the edge of the flap 34 and over the opening defined by the two flaps 33 and 34.

In order to engage the male member 10 with the female member 12, the female member 12 is brought across the opening and under the bar 22 and the base portion 16. The bar 22 is passed between the reversed curved portions 28 of the socket 14 and the female member is then pulled in a direction away from the male member 10, whereby the connecting portion 20 bears against the locator portions 26. Further force is applied snapping the connector portion 20 by the locater portion 26 and into the socket portion 24. The width between the locater portions 26 is slightly less than the width of the connector portion 20. The diameter of the socket portion 24 is greater than the length of the connector portion 20, but less than the length of the bar 22 to provide clearance for restrictive swiveling on the plane of the bar in relation to the female member 12; but the flat form of the bar 22 prevents the bar 22 from being lifted away from the female member 12 when they are completely engaged. However, the snug fit of the connector portion 20 and the socket portion 24 prevents accidental disengagement of the parts. The trailing edge of the bar 22 is in the same vertical plane as the rear edge of the connector portion 20 as shown in FIG. 4.

The embodiment shown in FIGS. 5 through 8 discloses the utilization of the fastener wherein the extension portion 18a and its accompanying connector portion 20a and bar 22a extend beyond the edge of a flap, on a garment for example, and where the female member 12a does not extend beyond the edge of a flap or edge 31. In this case the female member 12a is bar-tacked allowing the portions of the female member 12a having slots 14a to be flexed away from the flap 35. The bar 22a is spaced from the extension 18a and is attached so that it is directed toward the plane of the flap 37.

The base portion 16a has a different geometric configuration than that of the base portion 16 described hereinbefore. The connector portion 20a is arced to extend over the extension portion 18a placing the trailing edge of the bar 22a in spaced relation to the back edge of the connector portion 20a as shown in FIGS. 7 and 8.

Figure 10:
FIG. 10 is a side elevation of the male member shown in FIG. 9.

FIGS. 9 and 10 disclose still another variation of the male element 10b wherein the bar 22b is formed as a rod or cylinder so that the male element may rotate both toward and away from the support when engaged with the female member 12b. There are certain applications of the fastener which require this movement.

Figure 11:
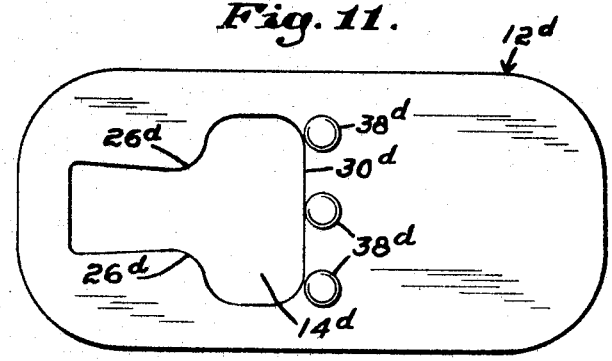
FIG. 11 is a top plan view of a variation of the female member shown in FIG. 2.
Figure 12:
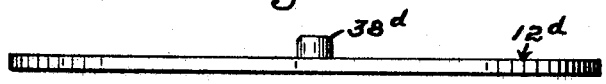
FIG. 12 is a side elevation of the female member shown in FIG. 11.

In FIGS. 11 and 12 a variation of the female member 12d is disclosed which retains the arcuate configuration of the locater portions 26d but which does not utilize a semicircular configuration for the socket portion; but instead utilizes diverging walls which terminate against a straight rear wall, and this general form is also utilized in what could be compared to the reversed curved portion 28 which also ends against straight rear walls. There have also been added a series of stops 38d which, in this case, are merely protuberances extending above the plane of the female member 12d which are spaced from the back wall 30d of the slot 14d. The stops 38d are utilized where a blind engagement is called for and will assist in properly indexing a male member of the type shown in FIGS. 7 and 8 with the slot 14d, avoiding the danger of having the bar in an improper position for engagement.

The fastener elements 10e and 12e depicted in FIGS. 13–18 are in many respects similar to those previously described.

The male element 10e includes a flat base portion 16e, an integral extension portion 18e extending laterally from the base portion and generally coplanar therewith, a connector portion 20e extending generally perpendicular upwardly from the end of the extension portion remote from the base, and a cross bar 22e joined to the extension portion by the connector portion. The underside of the fastener element 10e is provided with elongated stiffening means 40e. The length of the cross bar 22e is greater than the width of the extension portion 18e and the ends of the bar extend outwardly of the ends of the connector portion 20e The connector portion is solid and has a width $w$ which is greater than the thickness $T$ of both the base portion 16e and the extension portion 18e, and the width of the bar 22e is equal to the width $w$ of the connector portion 20e.

As best seen in FIG. 16, the length of the connector portion 20e is less at its upper end adjacent the bar 22e than at its lower end remote from the bar. Thus, the connector portion presents a trapezoidal configuration in transverse cross-section. The reason for providing the aforementioned configuration will be explained in detail hereinafter.

The female fastener member 12e is similar to the one described with reference to FIGS. 11 and 12 with the exception of the stiffening means 42e which have been provided along its outboard side edges. In addition, the member 12e is shown to have more than one slot, and the stops 38d have been eliminated.

FIGS. 17 and 18 depict an assembly wherein the fasteners 10e and 12e described above are employed to secure the opposed back straps of a brassiere. The straps 44e, which are usually of an elastic material, are stitched or otherwise secured to the terminal edges of the back panels 46e of the bra and the fasteners are secured at the fold in the straps so that the connector portion 20e and the bar 22e of the male member extend away from the back of the wearer, as does the stiffening means 42e on the female member. Coupling of the fastener members is accomplished by drawing the straps toward each other until the bar 22e can be passed in back of the female member 12e, and through the enlarged portion of one of the slots 14e and then drawing the members away from each other causing the connector portion 22e to snap past the locater portions 26e and ultimately seat against the rear wall 30e of the slot. The ends of the bar 22e extend over the surfaces of the female member adjacent the end of the slot. Thus the fasteners are securely locked under tension supplied by the back straps 44e.

Upon further consideration of FIGS. 17 and 18 the reader will observe that the pull on the male member 10e by the wall 30e of the female member is resisted by the solid connector portion 20e which has a substantial width. Thus, for certain applications wherein considerable tension is exerted on the fastener components the present variation is seen to be superior to the variation shown in FIGS. 6, 7, 8, wherein the connector portion is simply a bend of the same thickness of material as the base and extension portions of the male member. Further since the connector portion 20e abuts a substantial length of the side walls of the slot 14e adjacent the end wall 30e, the fastener members cannot become twisted with respect to one another in the plane of the drawings, i.e. in a plane parallel to the back of the wearer of the bra. In addition it is highly desirable in a bra back fastener arrangement that pivotal movement of the fastener members towards or away from the wearer's back be prohibited. Obviously considerable discomfort can result from the fastener pinching one's back. In the present variation inward pivotal movement of the free end of the female member is controlled by the backup of the extension portion 18e which underlies a substantial portion of said free end, and pivotal movement of the base and extension portions of the male member away from the female member and inwardly towards the wearer's back is controlled by the trapezoidal configuration of the connector portion 20e which binds on the side walls of the slot 14e and prevents outward movement of the free end of the male member, as can best be seen in the cross-sectional view of FIG. 18. The device of the present invention in all variations described thus provides a simple, yet highly efficient, fastener which is capable of ready connection and disconnection, has excellent holding characteristics and can be utilized effectively in many diverse applications.

While the invention has been described in detail, it is to be clearly understood that this is intended to be by way of illustration and example only and is not to be taken by way of limitation; the spirit and scope of the invention being limited only by the terms of the following claims.

We claim:

1. A unitary male fastener element formed of a polymeric material comprising a base portion, an extension portion extending laterally from said base portion, a solid connector portion extending upwardly from said extension portion and a cross bar joined to said extension portion through said connector portion, said bar being substantially flat and having a length greater than the width of said extension portion, said connector portion having a width measured in a plane parallel to said extension portion and said base portion, said width being at least substantially greater than the thickness of said base portion and said extension portion, the surfaces of said cross bar and said connector portion most remote from said extension portion being substantially coplanar, said connector portion being narrower at its top portion adjacent said bar than at its bottom portion remote from said bar as viewed in transverse cross section.

2. A unitary male fastener element according to claim 1 wherein the width of said bar is at least equal to the width of said connector portion.

3. A unitary male fastener element according to claim 1 wherein said extension portion is provided with integral stiffening means at its undersurface.

4. A fastener combination particularly adapted for securing the opposed straps of a bra comprising a unitary male fastener element of a polymeric material including a flat base portion secured to one of the straps, an extension portion extending from said base portion toward the other of the straps, a solid connector portion extending upwardly from said base portion and a cross bar joined to said extension portion through said connector portion, said cross bar being substantially flat and having a length greater than the width of said extension portion, said connector portion having a width measured in a plane parallel to said connector portion and said base portion which is at least substantially greater than the thickness of said base portion, the surfaces of said cross bar and said connector portion most remote from said extension portion being substantially coplanar, and a unitary female fastener element of polymeric material including a base portion having one end secured to the other of the straps and extending toward the first-mentioned of the straps and the male fastener element, said female element having at least one slot formed therethrough in the plane of said base portion, said slot having an enlarged portion of a width at least equal to the length of said cross bar and a narrow portion extending from said enlarged portion and terminating in a transverse engagement wall, said narrow portion having a width substantially equal to the length of said connector portion adjacent said bar, said fastener elements being connected by passing said bar and connector portion through the enlarged portion of said slot and drawing said connector portion through the narrow portion of said slot and up against said engagement wall such that the surfaces of said bar least remote from said extension portion lie flush against the surfaces of said female member adjacent said slot to prevent accidental disengagement of said elements and the end of said female element remote from its end secured to the strap overlies a substantial portion of the extension portion of said male element to prevent pivotal movement of said female element with aspect to said male element, the length of said connector portion remote from said bar being appreciably greater than its length adjacent said bar to provide increased interference with the internal walls of said female element defining the narrow portion of the slot therein, thereby restricting pivotal movement of said male element away from said female element under normal usage conditions.

5. A fastener combination according to claim 4 wherein said female element is provided with integral stiffening means along its outboard edges.

References Cited

UNITED STATES PATENTS

| | | | |
|---|---|---|---|
| 1,068,600 | 7/1913 | McWilliams | 24—225 |
| 1,079,411 | 11/1913 | Holmcrans | 24—224 |
| 1,156,008 | 10/1915 | Humphrey | 24—224 X |
| 1,284,238 | 11/1918 | Carmichiel | 24—224 |
| 1,787,728 | 1/1931 | Hood | 24—225 X |
| 2,275,226 | 3/1942 | Hudson | 24—221 |
| 2,482,846 | 9/1949 | Fox | 24—206 |
| 2,653,323 | 9/1953 | Ganim | 128—506 |
| 3,237,984 | 3/1966 | Schneider et al. | 24—201 X |

FOREIGN PATENTS 115,565  5/1918  Great Britain.

BOBBY R. GAY, *Primary Examiner.*

ERNEST SIMONSEN, *Assistant Examiner.*